(12) United States Patent
Huang et al.

(10) Patent No.: US 12,451,549 B1
(45) Date of Patent: Oct. 21, 2025

(54) ENERGY STORAGE DEVICE

(71) Applicant: Shenzhen Hello Tech Energy Co., Ltd, Guangdong (CN)

(72) Inventors: Enlun Huang, Guangdong (CN); Zhongwei Sun, Guangdong (CN); Dongxiong Tan, Guangdong (CN); Jian Fang, Guangdong (CN)

(73) Assignee: SHENZHEN HELLO TECH ENERGY CO., LTD, Guangdong (CN)

( * ) Notice: Subject to any disclaimer, the term of this patent is extended or adjusted under 35 U.S.C. 154(b) by 0 days.

(21) Appl. No.: 19/002,796

(22) Filed: Dec. 27, 2024

(30) Foreign Application Priority Data

Apr. 19, 2024 (CN) .......................... 202410482230.X

(51) Int. Cl.
| | | |
|---|---|---|
| *H01M 50/24* | (2021.01) | |
| *G01V 3/02* | (2006.01) | |
| *H01M 50/204* | (2021.01) | |
| *H01M 50/296* | (2021.01) | |
| *H01M 50/298* | (2021.01) | |

(52) U.S. Cl.
CPC .............. *H01M 50/24* (2021.01); *G01V 3/02* (2013.01); *H01M 50/204* (2021.01); *H01M 50/296* (2021.01); *H01M 50/298* (2021.01)

(58) Field of Classification Search
CPC .. H01M 50/24; H01M 50/204; H01M 50/296; H01M 50/298; G01V 3/02
See application file for complete search history.

(56) References Cited

U.S. PATENT DOCUMENTS 5,824,883 A * 10/1998 Park ..................... H01M 10/488
  73/49.3
6,337,559 B1 * 1/2002 Sato ..................... H01M 50/574
  320/134

(Continued)

FOREIGN PATENT DOCUMENTS

CN 203839456 U 9/2014
CN 107402107 A 11/2017
(Continued)

OTHER PUBLICATIONS

First Office Action from corresponding Chinese Application No. 202410482230.X, dated Sep. 13, 2024. English translation attached.

(Continued)

*Primary Examiner* — Michael L Dignan

(57) ABSTRACT

The present disclosure discloses an energy storage device, including a battery pack, a waterproof plug, and a water immersion detection unit. The battery pack includes a housing and a connection terminal. The housing has an opening, and the connection terminal is disposed at the opening. The waterproof plug includes an electrical connection member configured to electrically connect to the connection terminal in response to the waterproof plug covering the opening, and configured to generate a first signal in response to water flowing into the opening. The water immersion detection unit is configured to determine that the water flows into the opening through detecting the first signal. The waterproof plug is small in size and has a simple structure, which is beneficial for reducing production costs of the energy storage device.

19 Claims, 6 Drawing Sheets

(56) References Cited

U.S. PATENT DOCUMENTS

| | | | | |
|---|---|---|---|---|
| 10,884,025 | B2* | 1/2021 | Huang | G01R 1/0408 |
| 11,437,654 | B2* | 9/2022 | Yamashima | H01M 10/44 |
| 2007/0275296 | A1* | 11/2007 | Ueda | G01M 3/16 |
| | | | | 429/61 |
| 2010/0203378 | A1 | 8/2010 | Narbonne et al. | |
| 2020/0313128 | A1* | 10/2020 | Schnakenberg | H01M 50/258 |
| 2022/0328999 | A1* | 10/2022 | Zhang | B60L 58/26 |
| 2024/0014464 | A1* | 1/2024 | Jang | H01M 50/204 |
| 2024/0213547 | A1* | 6/2024 | Wang | H01M 50/298 |

FOREIGN PATENT DOCUMENTS

| | | |
|---|---|---|
| DE | 102012224457 A1 | 2/2014 |
| DE | 102013201411 A1 | 7/2014 |
| EP | 2787556 A1 | 10/2014 |
| KR | 102387285 B1 | 4/2022 |
| WO | 2023273971 A1 | 1/2023 |

OTHER PUBLICATIONS

The Grant Notice from corresponding Chinese Application No. 202410482230.X, dated Sep. 30, 2024. English translation attached.

Zong, Lei et al. "Water immersion test and analysis of lithium-ion power battery system" Beijing Automotive, Feb. 25, 2020 (Feb. 25, 2020).

Extended European Search Report dated Jul. 29, 2025 received in corresponding European Application No. EP25156486.0.

* cited by examiner

ENERGY STORAGE DEVICE

CROSS-REFERENCE TO RELATED APPLICATIONS

This application claims priority to Chinese Patent Application No. 202410482230.X, filed on Apr. 19, 2024, which is hereby incorporated by reference in its entirety.

FIELD

The present disclosure relates to the field of energy storage technologies, and more particularly, to an energy storage device.

BACKGROUND

An energy storage device generally includes a plurality of battery packs that are laminated to each other. Each battery pack typically has an opening formed at a bottom of a housing of the battery pack, and is provided with a connection terminal at the opening. When assembled, each battery pack is connected to a lower battery pack through the connection terminal. Meanwhile, the lower battery pack covers an opening of an upper battery pack. Due to the existence of the opening, water easily flows into the battery pack, especially into a lowest battery pack, which easily damages the energy storage device or causes safety accidents.

SUMMARY

Implementations of the present disclosure provide an energy storage device.

The energy storage device according to the implementations of the present disclosure includes: a battery pack including a housing and a connection terminal, the housing having an opening, and the connection terminal being disposed at the opening; a waterproof plug including an electrical connection member, the electrical connection member being configured to: electrically connect to the connection terminal in response to the waterproof plug covering the opening, and generate a first signal in response to water flowing into the opening; and a water immersion detection unit configured to determine, by detecting the first signal, that the water flows into the opening.

With the energy storage device provided according to the implementations of the present disclosure, by disposing the waterproof plug at an opening of the lowest battery pack and allowing the waterproof plug to generate the first signal in response to the water flowing into the opening, while utilizing the water immersion detection unit to detect the first signal to determine whether there is any water leakage at the opening, a water immersion detection at the opening is achieved, thereby effectively improving safety and reliability of the energy storage device. In addition, the waterproof plug is small in size and has a simple structure, which is beneficial for reducing production costs of the energy storage device.

In some embodiments, the connection terminal includes a first needle seat and a second needle seat; the water immersion detection unit is connected to the first needle seat and the second needle seat; the electrical connection member includes a first signal needle, a second signal needle, and a water immersion detection wire; the first signal needle is connected to the second signal needle through the water immersion detection wire; the water immersion detection wire is configured to generate the first signal in response to detecting water immersion; in response to the waterproof plug covering the opening, the first signal needle is electrically connected to the first needle seat, and the second signal needle is electrically connected to the second needle seat; and the water immersion detection unit is configured to detect, by means of the first needle seat and the second needle seat, an electrical parameter of the water immersion detection wire to detect the first signal.

In this way, the water immersion detection unit may detect whether there is any water leakage at the opening of the battery pack through changes in the electrical parameter.

In some embodiments, the electrical parameter is a voltage, a current, or a resistance value of the water immersion detection wire.

In this way, a parameter that is convenient to test or more accurate can be flexibly selected based on actual situations to detect the first signal.

In some embodiments, the water immersion detection wire includes a first detection wire and a second detection wire that are spaced apart from each other. The first detection wire is connected to the first signal needle, and the second detection wire is connected to the second signal needle.

In this way, the water immersion detection wire has a simple structure and low in cost, which is beneficial for reducing the production costs of the energy storage device.

In some embodiments, the first detection wire and the second detection wire are disposed on a surface of the waterproof plug away from the battery pack.

In this way, the water immersion detection wire is disposed at a lower part of the battery pack and may contact water under the battery pack at the first time, thereby generating the first signal at the first time.

In some embodiments, the electrical connection member is configured to connect to the connection terminal to generate a second signal in response to the waterproof plug covering the opening. The energy storage device further includes a short circuit detection unit configured to determine, by detecting the second signal, a communication address of the battery pack.

In this way, by providing the waterproof plug, the short circuit detection unit can determine the communication address of the battery pack.

In some embodiments, the first needle seat is connected to a power supply terminal; the second needle seat is connected to a ground terminal through a first resistor; the first signal needle is connected to the second signal needle through a diode; the energy storage device further includes a control assembly including first switch elements, second switch elements, and a controller; the first switch elements are disposed between the water immersion detection unit and the first needle seat, and between the water immersion detection unit and the second needle seat, respectively; the second switch elements are between the power supply terminal and the first needle seat, and between the ground terminal and the second needle seat, respectively; the controller is configured to control the first switch elements and the second switch elements, to enable the first needle seat and the second needle seat to switch between a first state where each of the first needle seat and the second needle seat is connected to the water immersion detection unit and a second state where the first needle seat is connected to the power supply terminal and the second needle seat is connected to the ground terminal; and when the first needle seat and the second needle seat are in the second state, the short circuit detection unit is configured to detect the second signal to determine that the battery pack is located at the bottom of the energy storage device; and when the first needle seat and the second needle seat are in the first state, the water immersion detection unit is controlled to detect the first signal when the opening is covered the waterproof plug, to determine that the water flows into the opening.

In this way, the control assembly can control operation states of the short circuit detection unit and the water immersion detection unit by switching operation states of the first needle seat and the second needle seat, allowing the short circuit detection unit and the water immersion detection unit to operate alternately.

In some embodiments, each of the water immersion detection unit, the short circuit detection unit, and the control assembly is disposed at the battery pack.

In this way, the waterproof plug is a consumable part that is easily damaged and lost, which can reduce a quantity of elements and components on the waterproof plug as much as possible and reduce production costs of the waterproof plug, thereby indirectly reducing maintenance costs of the energy storage device.

In some embodiments, the waterproof plug includes a sealing bottom plate. The electrical connection member is disposed at the sealing bottom plate and extends into the opening to cooperate with the connection terminal, and the sealing bottom plate covers the opening outside the housing.

In this way, the waterproof plug has a simple structure, which is easy to manufacture and beneficial for reducing the production cost.

In some embodiments, the connection terminal includes a first guide portion, and the waterproof plug includes a second guide portion. The waterproof plug is configured to ensure, through a cooperation between the first guide portion and the second guide portion, an accurate insertion of the electrical connection member into the connection terminal.

In this way, the first guide portion cooperates with the second guide portion for guiding, which facilitates an accurate alignment of the electrical connection member with the connection terminal.

In some embodiments, the connection terminal includes a terminal portion in a columnar shape. The first guide portion includes an outer cylindrical surface of the terminal portion, and the second guide portion includes a guide sleeve extending upward from the sealing bottom plate and matching with the outer cylindrical surface.

In this way, the guide sleeve matches with the outer cylindrical surface, which can improve matching accuracy of the electrical connection member and the connection terminal while limiting freedom degrees in two directions.

In some embodiments, the energy storage device includes a plurality of battery packs that are laminated to each other. Each of the plurality of battery packs is connected to a lower battery pack of the plurality of battery packs through the connection terminal, and a lowest battery pack of the plurality of battery packs is connected to the waterproof plug.

Additional aspects and advantages of the implementations of the present disclosure will be provided in part in the following description, or will become apparent in part from the following description, or can be learned from practicing of the implementations of the present disclosure.

BRIEF DESCRIPTION OF THE DRAWINGS

The above and/or additional aspects and advantages of the present disclosure will become apparent and understandable from the following description of implementations taken in conjunction with the accompanying drawings, in which.

Figure 1:
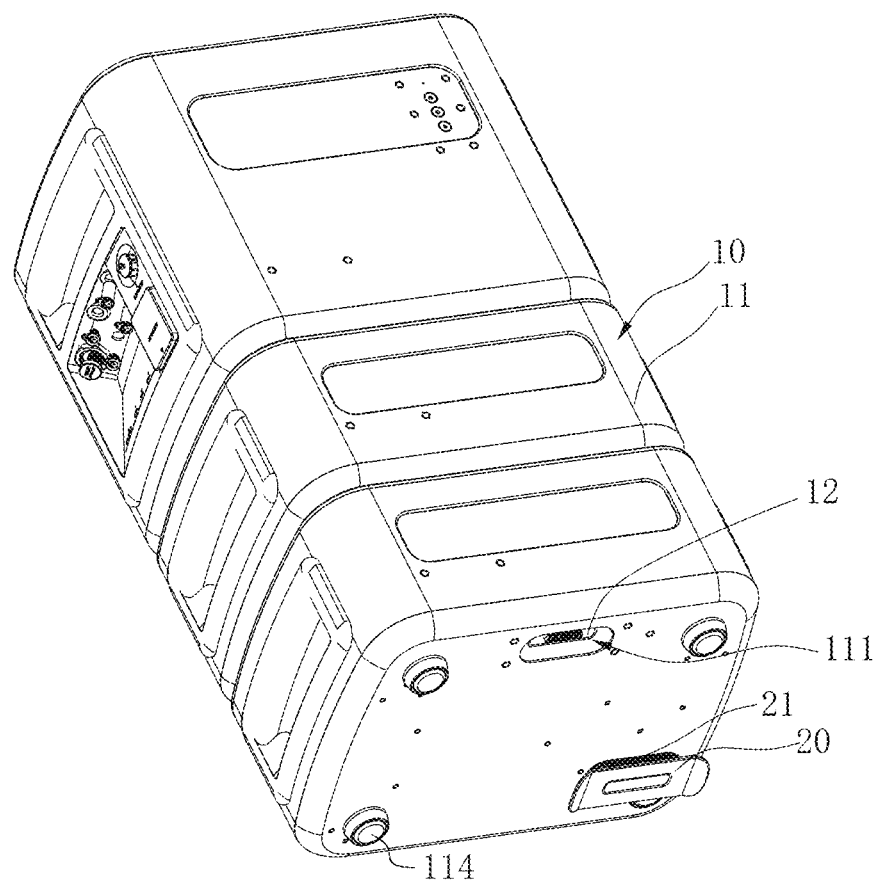
FIG. 1 is a schematic perspective view of an energy storage device according to an implementation of the present disclosure.

MAIN REFERENCE SIGNS OF COMPONENTS energy storage device 100, battery pack 10, housing 11, opening 111, accommodation groove 112, handle 113, support foot 114, connection terminal 12, first needle seat 121, second needle seat 122, first guide portion 13, guide hole 131, terminal portion 14, outer cylindrical surface 141, connection plug 15, waterproof plug 20, electrical connection member 21, first signal needle 211, second signal needle 212, sealing bottom plate 22, warping edge 221, second guide portion 23, guide sleeve 231, guide post 232, water immersion detection wire 24, first detection wire 241, second detection wire 242, diode 25, water immersion detection unit 30, short circuit detection unit 40, power supply terminal 50, ground terminal 60, first resistor 70, controller 80, first switch elements 81, second switch elements 82.

DETAILED DESCRIPTION

The implementations of the present disclosure will be described in detail below with reference to examples thereof as illustrated in the accompanying drawings, throughout which same or similar elements, or elements having same or similar functions, are denoted by same or similar reference numerals. The implementations described below with reference to the accompanying drawings are exemplary, only used to explain the present disclosure, and should not be construed as limitation of the present disclosure. In the description of the present disclosure, it needs to be understood that, orientation or position relationship indicated by terms such as "center", "longitudinal", "lateral", "length", "width", "thickness", "over", "below", "front", "back", "left", "right", "vertical", "horizontal", "top", "bottom", "in", "out", "clockwise", and "anti-clockwise", is based on the orientation or position relationship shown in the accompanying drawings, and is merely for the convenience of describing the present disclosure and simplifying the description, rather than indicating or implying that the associated device or element must have a specific orientation, or be constructed and operated in a specific orientation, and therefore cannot be understood as a limitation on the present disclosure. In the description of the present disclosure, the term "plurality" means two or more, unless defined otherwise explicitly and specifically.

In the description of the present disclosure, it needs to be noted that, unless specified and defined otherwise explicitly, the terms "install", "connect", "connect to", and the like should be interpreted in a broad sense. For example, it may be a fixed connection or a detachable connection or connection as one piece; mechanical connection or electrical connection; direct connection or indirect connection through an intermediate; internal communication of two components or the interaction relationship between two components. For those of ordinary skill in the art, the specific meanings of the above terms in the present disclosure can be interpreted depending on specific situations.

In the present disclosure, unless expressly stipulated and defined otherwise, the first feature "on" or "under" the second feature may include that the first feature is in direct contact with the second feature, or further include that the first and second features are in indirect contact through another features between the first and second features. Moreover, the first feature "above" the second feature may mean that the first feature is directly above or obliquely above the second feature, or simply mean that the level of the first feature is higher than that of the second feature. The first feature "below" the second feature may mean that the first feature is directly below or obliquely below the second feature, or simply mean that the level of the first feature is smaller than that of the second feature.

Various implementations or examples for implementing different structures of the present disclosure are provided below. In order to simplify the description of the present disclosure, components and arrangements of specific examples are described herein. These specific examples are merely for the purpose of illustration, rather than limiting the present disclosure. Further, the same reference numerals and/or reference letters may appear in different examples of the present disclosure for the purpose of simplicity and clarity, instead of indicating a relationship between different implementations and/or the discussed arrangements. In addition, the present disclosure provides examples of various specific processes and materials. However, applications of other processes and/or the use of other materials are conceivable for those of ordinary skill in the art.

An energy storage device generally includes a plurality of battery packs that are laminated to each other. Each battery pack has an opening generally formed at a bottom of a housing of each battery pack, and a connection terminal is provided at the opening. When assembled, each battery pack is connected to a lower battery pack through the connection terminal. Meanwhile, the lower battery pack covers an opening of an upper battery pack. Due to the existence of the opening, water easily flows into the battery pack, especially into a lowest battery pack, which easily damages the energy storage device or causes safety accidents.

In some embodiments, as illustrated in FIG. 1, the energy storage device 100 provided by the present disclosure may be a balcony photovoltaic energy storage device. The balcony photovoltaic energy storage device is relatively miniaturized and easy to carry and move, and its position may be transferred as user's power demands. For example, the device is transferred from a balcony to a garage or even the outdoors.

Figure 2:
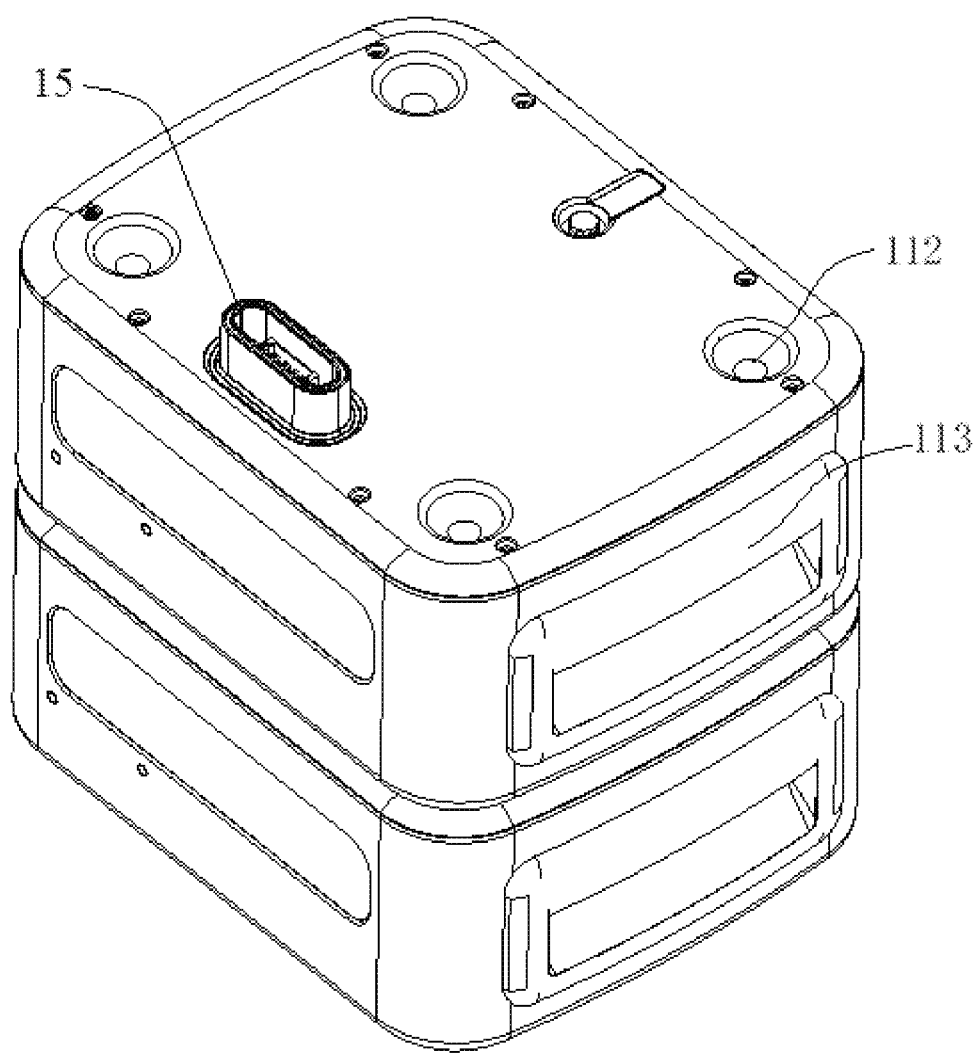
FIG. 2 is a partially schematic perspective view of an energy storage device according to an implementation of the present disclosure in another viewing angle.
Figure 3:
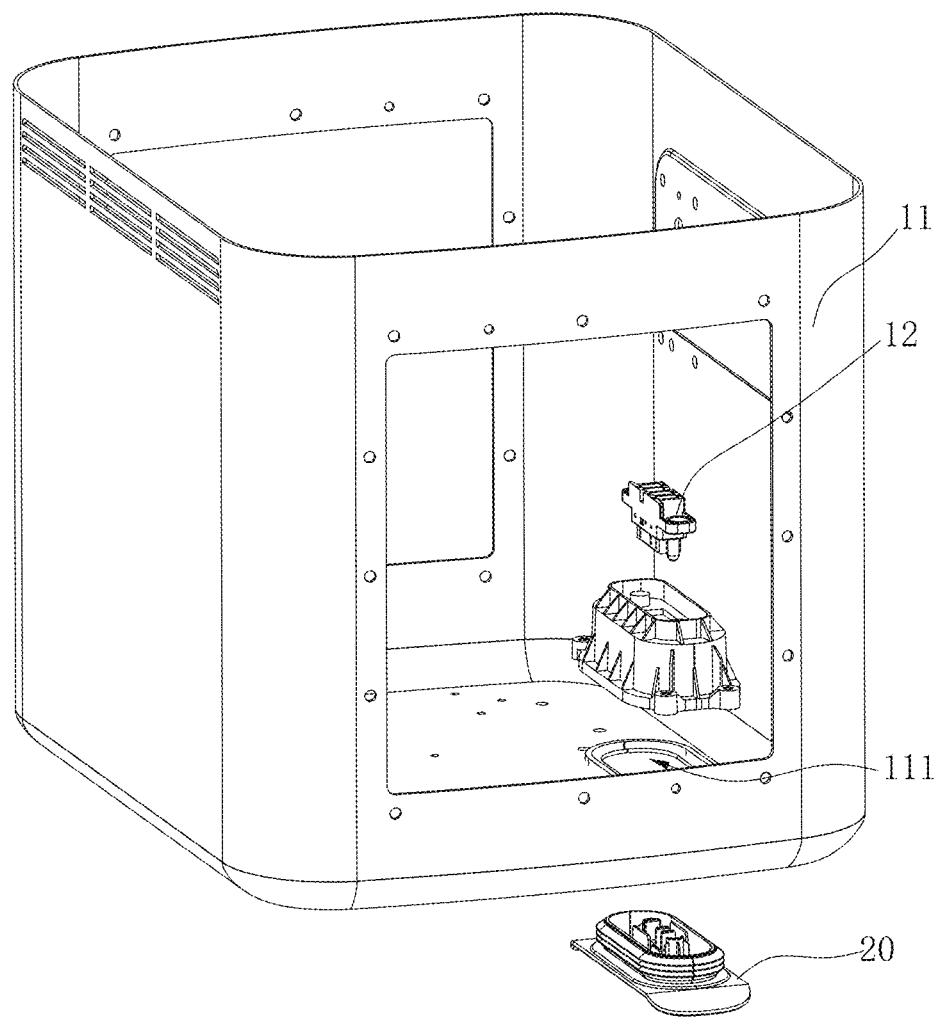
FIG. 3 is a partially perspective exploded view of an energy storage device according to an implementation of the present disclosure.

Referring to FIG. 1 to FIG. 3, an energy storage device 100 according to the implementations of the present disclosure includes a battery pack 10, a waterproof plug 20, and a water immersion detection unit 30. The battery pack 10 includes a housing 11 and a connection terminal 12. The housing 11 has an opening 111, and the connection terminal 12 is disposed at the opening 111. The waterproof plug 20 includes an electrical connection member 21 configured to electrically connect to the connection terminal 12 in response to the waterproof plug 20 covering the opening 111, and configured to generate a first signal in response to water flowing into the opening 111. The water immersion detection unit 30 is configured to determine, by detecting the first signal, that the water flows into the opening 111.

With the energy storage device 100 provided by implementations of the present disclosure, by disposing the waterproof plug 20 at an opening 111 of the lowest battery pack 10 and allowing the waterproof plug 20 to generate the first signal in response to the water flowing into the opening 111, while utilizing the water immersion detection unit 30 to detect the first signal to determine whether there is any water leakage at the opening 111, a water immersion detection at the opening 111 is achieved, thereby effectively improving safety and reliability of the energy storage device 100. In addition, the waterproof plug 20 is small in size and has a simple structure, which is beneficial for reducing production costs of the energy storage device 100.

Specifically, the energy storage device 100 refers to an apparatus capable of storing electric energy or energy in other forms, and releasing the energy when needed and supplying it to a power system or other devices for use. In the embodiment of the present disclosure, the energy storage device 100 refers to a household-portable energy storage device 100. The energy storage device 100 usually includes a functional unit and a plurality of battery packs 10. The plurality of battery packs 10 are laminated to each other. The plurality of battery packs may specifically include an energy storage integrated machine and at least one battery expansion pack. The energy storage integrated machine mainly includes an inverter and a battery module internally, and the battery expansion pack mainly includes a battery module. As illustrated in FIG. 1, after the energy storage integrated machine and the at least one battery expansion pack are laminated to each other, electric conduction and signal conduction may be realized between the integrated machine and the battery expansion pack after the integrated machine and the battery expansion pack are connected through their respective connection terminals, thus realizing battery capacity expansion of the energy storage device 100.

The functional unit is responsible for monitoring, managing, and controlling a battery state, a current, a voltage, and other parameters of the battery pack 10. The functional unit usually includes an inverter, a power device, and the like. Further, by introducing advanced technologies such as artificial intelligence and big data, an operation strategy of the energy storage device 100 may be optimized, improving energy utilization efficiency and system stability.

The battery pack 10 is a core part of the energy storage device 100, and is responsible for storage and release of the electric energy. In order to increase electricity reserves, the energy storage device 100 generally includes a plurality of battery packs 10, and each battery pack 10 usually includes components such as a battery management system (BMS).

The housing 11 of the battery pack 10 is usually an injection-molded plastic housing 11. The housing 11 is provided with handles 113 at two sides of the housing 11 in a height direction of the housing 11. The handle 113 is used for carrying and moving the battery pack 10. A bottom of the housing 11 is provided with a support foot 114 for supporting the housing 11. When the battery pack 10 is used independently, the support foot 114 may make the battery pack 10 overhead and play a certain waterproof effect. Correspondingly, a top of the housing 11 has an accommodation groove 112 for accommodating the support foot 114.

When the plurality of battery packs 10 are laminated together, the support foot 114 may be placed in the accommodation groove 112, to allow a contact area of housings 11 of adjacent battery packs 1010 to be larger and also to make the lamination more secure while dispersing a pressure. In addition, since the opening 111 is usually formed at the bottom of the housing 11, a tight fit of the housing 11 also enables its covering at the opening 111. The housing 11 with this arrangement also allows the plurality of battery packs 10 to be connected in a block building form, which is convenient for a user to reduce or expand a quantity of battery packs 10 as required.

Since the opening 111 is usually formed at the bottom of the housing 11, the connection terminal 12 is usually located at a bottom of the battery pack 10. Correspondingly, a top of the battery pack 10 is provided with a connection plug 15. When the two battery packs 10 are laminated to each other, a connection plug 15 at the lowest battery pack 10 is inserted into an opening 111 at a highest battery pack 10 and is electrically connected to the connection terminal 12, to realize communication between the two battery packs 10.

In other embodiments, the connection terminal 12 may be disposed at the top of the battery pack 10, and the connection plug 15 may be disposed at the bottom of the battery pack 10. At this time, the waterproof plug 20 is used for connecting to the connection plug 15 and covering the connection plug 15.

The water immersion detection unit 30 is an apparatus for monitoring water immersion, may monitor a water level change or a water leakage situation in real time, and gives an alarm timely once an abnormality is monitored, thereby avoiding occurrence of major accidents or property losses.

Referring to FIG. 3 to FIG. 8, in some embodiments, the connection terminal 12 includes a first needle seat 121 and a second needle seat 122. The water immersion detection unit 30 is connected to the first needle seat 121 and the second needle seat 122. The electrical connection member 21 includes a first signal needle 211, a second signal needle 212, and a water immersion detection wire 24. The first signal needle 211 is connected to the second signal needle 212 through the water immersion detection wire 24. The water immersion detection wire 24 is configured to generate the first signal in response to detecting water immersion. In response to the waterproof plug 20 covering the opening 111, the first signal needle 211 is electrically connected to the first needle seat 121, and the second signal needle 212 is electrically connected to the second needle seat 122. The water immersion detection unit 20 is configured to detect, by means of the first needle seat 121 and the second needle seat 122, an electrical parameter of the water immersion detection wire 24 to detect the first signal.

In this way, the water immersion detection unit 30 may detect whether there is any water leakage at the opening 111 of the battery pack 10 through changes in the electrical parameter.

In some embodiments, the electrical parameter may be a voltage, a current, or a resistance value of the water immersion detection wire 24.

Specifically, in this embodiment, a water immersion detection method is that when the water immersion detection wire 24 is not immersed in the water, its resistance is usually high resistance approaching an open circuit, with a value usually greater than 1000 kΩ. When the water flows into a chassis bottom, the water immersion detection wire 24 is allowed to be immersed in the water, and its resistance becomes smaller and has a value smaller than 1000 kΩ, usually tens to 200 kΩ.

Therefore, when the water immersion occurs, the resistance of the water immersion detection wire 24 between the first needle seat 121 and the second needle seat 122 becomes smaller and is smaller than its predetermined value, thereby transmitting a signal that the water flows into the chassis bottom of the battery pack 10.

Figure 8:
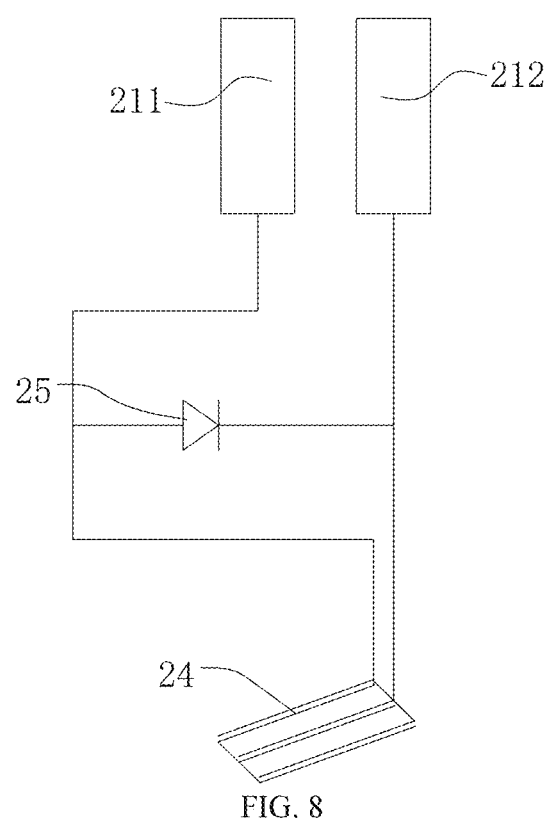
FIG. 8 is a schematic circuit diagram of a waterproof plug according to an implementation of the present disclosure.

Referring to FIG. 8, in some embodiments, the water immersion detection wire 24 includes a first detection wire 241 and a second detection wire 242 that are spaced apart from each other. The first detection wire 241 is connected to the first signal needle 211, and the second detection wire 242 is connected to the second signal needle 212.

In this way, the water immersion detection wire 24 has a simple structure and low in cost, which is beneficial for reducing the production costs of the energy storage device 100.

Specifically, the first detection wire 241 and the second detection wire 242 are spaced apart from each other, which is equivalent to the open circuit at this time, with the resistance approaching infinity, which is generally understood to be greater than 1000 kΩ. When a water level is too high, both the first detection wire 241 and the second detection wire 242 are immersed in water. At this time, the first detection wire 241 and the second detection wire 242 are connected by water, and the resistance value decreases.

The first detection wire 241 and the second detection wire 242 should not be spaced apart too large, to avoid failure of conduction of the first detection wire 241 and the second detection wire 242.

Optionally, the first detection wire 241 may be arranged in an E-shape, an S-shape, an M-shape, an H-shape, or the like, to more facilitate the conduction of the first detection wire 241 and the second detection wire 242 by water. Similarly, the second detection wire 242 may be arranged in an E-shape, an S-shape, an M-shape, an H-shape, or the like. In the embodiment, the first detection wire 241 and the second detection wire 242 are arranged in an E-shape opposite to each other.

Figure 5:
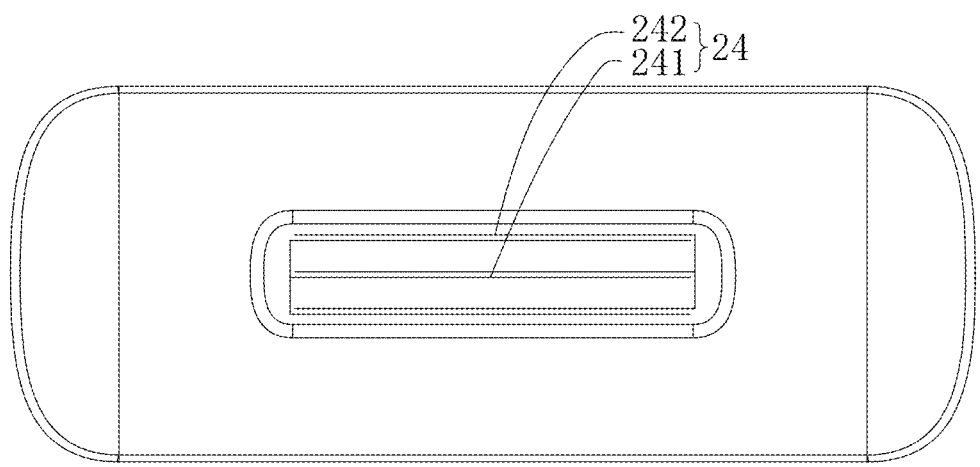
FIG. 5 is a schematic plan view of a waterproof plug of an energy storage device according to an implementation of the present disclosure.
Figure 6:
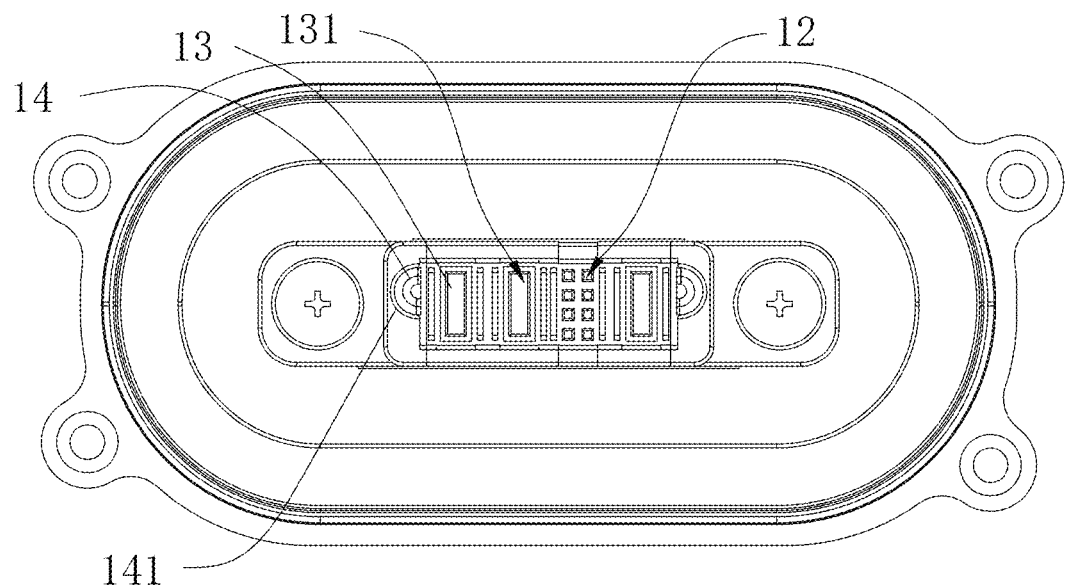
FIG. 6 is a schematic plan view of a connection terminal of a battery pack of an energy storage device according to an implementation of the present disclosure.

Referring to FIG. 5, in some embodiments, the first detection wire 241 and the second detection wire 242 are disposed on a surface of the waterproof plug 20 away from the battery pack 10.

In this way, the water immersion detection wire 24 is disposed at a lower part of the battery pack 10 and may contact water under the battery pack 10 at the first time, thereby generating the first signal at the first time.

Specifically, since the waterproof plug 20 is located at the bottom of the battery pack 10, the surface of the waterproof plug 20 facing away from the battery pack 10 is a surface of the bottom of the battery pack 10 closest to the ground. The water immersion detection wire 24 is disposed on the surface, which can detect overflowing water more quickly, allowing the user to have a longer processing time, which is beneficial for improving the reliability and a service life of the energy storage device 100.

Figure 7:
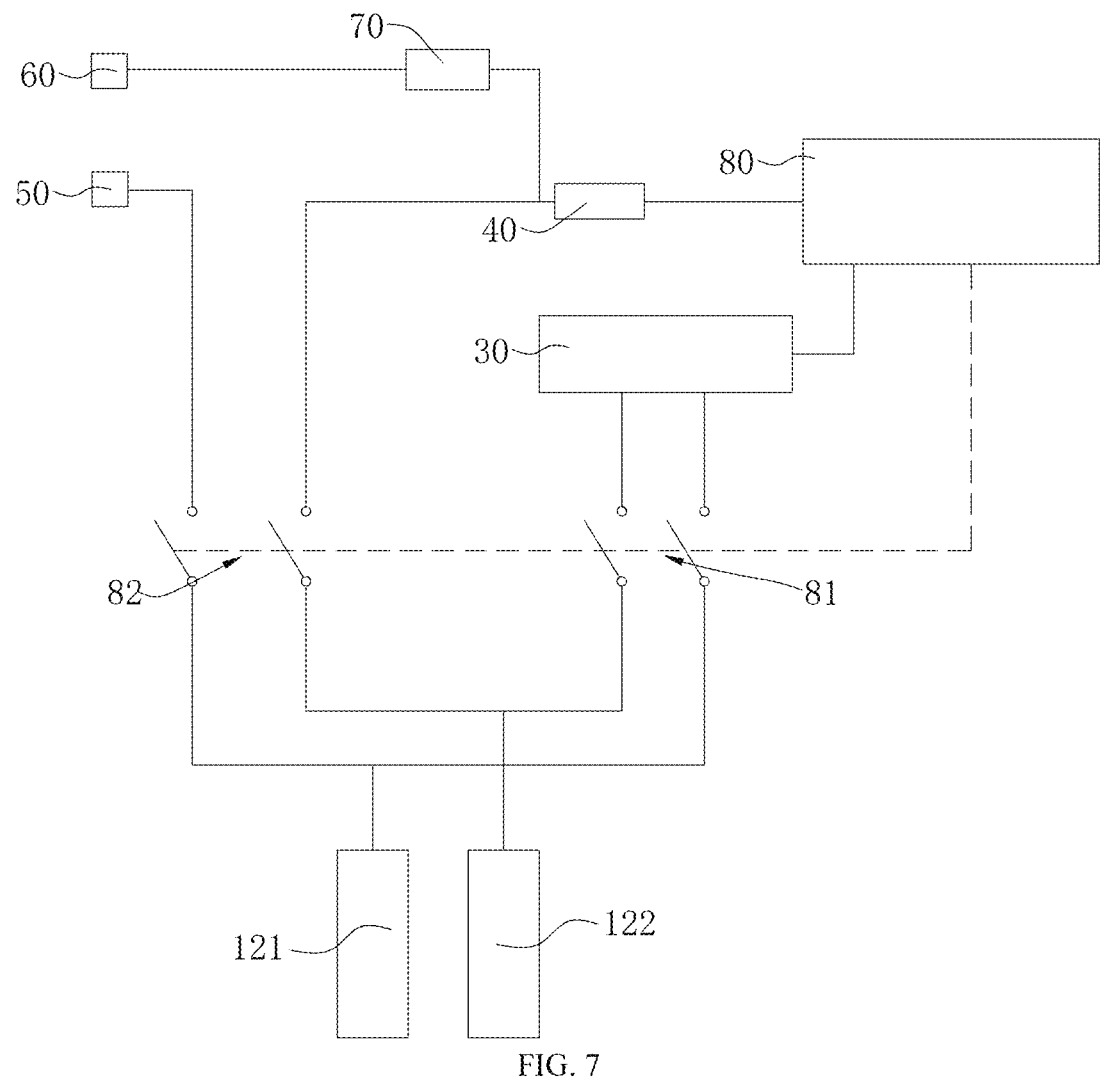
FIG. 7 is a schematic circuit diagram of a battery pack according to an implementation of the present disclosure.

Referring to FIG. 7, in some embodiments, the electrical connection member 21 is configured to connect to the connection terminal 12 to generate a second signal in response to the waterproof plug 20 covering the opening 111. The energy storage device 100 includes a short circuit detection unit 40 configured to determine, by detecting the second signal, that the battery pack 10 is located at the bottom of the energy storage device 100, thereby facilitating communication address encoding performed by the battery pack.

In this way, by providing the waterproof plug 20, the short circuit detection unit 40 can determine whether the battery pack 10 is located at the bottom of the energy storage device 100, thereby facilitating the communication address encoding performed by the battery pack.

Specifically, the short circuit detection unit 40 is an apparatus for detecting whether a short circuit (i.e., a short) occurs in a circuit and usually includes a sensor, a signal processing circuit, an alarm mechanism, and other parts. The sensor is used for monitoring a current, a voltage, or other related parameters in the circuit in real time. When an abnormal value is detected, the signal processing circuit performs analysis and determination.

The plurality of battery packs 10 are laminated to each other. The laminated battery packs 10 may communicate with each other and be identified according to different addresses. For example, the topmost battery pack 10 is the first one, and the address increases by 1 from top to bottom, with the lowest battery pack 10 being the last one. The short circuit detection unit 40 may identify the second signal generated by a connection between the electrical connection member 21 and the connection terminal 12. Since only the lowest battery pack 10 is short circuited, in response to the battery pack 10 not generating the second signal, the battery pack 10 is not the lowest battery pack 10, and the address needs to continue to increase by 1 in sequence. In response to the battery pack 10 generating an identification signal, the short circuit detection unit 40 identifies the signal and determines the battery pack 10 as the last battery pack 10. At this time, the address no longer continues to increase, and the quantity of battery packs 10 is determined based on an address of the last battery pack 10.

Referring to FIG. 7 and FIG. 8, in some embodiments, the first needle seat 121 is connected to a power supply terminal 50. The second needle seat 122 is connected to a ground terminal 60 through a first resistor 70. The first signal needle 211 is connected to the second signal needle 212 through a diode 25. The energy storage device 100 further includes a control assembly including first switch elements 81, second switch elements 82, and a controller 80. The first switch elements 81 are disposed between the water immersion detection unit 30 and the first needle seat 121, and between the water immersion detection unit 30 and the second needle seat 122, respectively. The second switch elements 82 are between the power supply terminal 50 and the first needle seat 121, and between the ground terminal 60 and the second needle seat 122, respectively. The controller 80 is configured to control the first switch elements 81 and the second switch elements 82, to enable the first needle seat 121 and the second needle seat 122 to switch between a first state where each of the first needle seat 121 and the second needle seat 122 is connected to the water immersion detection unit 30 and a second state where the first needle seat 121 is connected to the power supply terminal 50 and the second needle seat 122 is connected to the ground terminal 60. When the first needle seat 121 and the second needle seat 122 are in the second state, the short circuit detection unit 40 is configured to determine that the battery pack 10 is located at the bottom of the energy storage device 100 through detecting the second signal. When the first needle seat 121 and the second needle seat 122 are in the first state, the water immersion detection unit 30 is configured to determine that the water flows into the opening 111 through detecting the first signal when the waterproof plug 20 covers the opening 111.

In this way, the control assembly can control operation states of the short circuit detection unit 40 and the water immersion detection unit 30 by switching operation states of the first needle seat 121 and the second needle seat 122, allowing the short circuit detection unit 40 and the water immersion detection unit 30 to operate alternately.

Specifically, the second signal is a high level of the second needle seat 122. The short circuit detection method is described below. When no waterproof plug 20 is mounted, the second needle seat 122 is pulled down by the resistor to a power source ground terminal 60. At this time, the second needle seat 122 is at a low level. It may be identified that the battery pack 10 has no waterproof plug 20 mounted and is not located at the bottom of the device.

When the waterproof plug 20 is mounted, the first needle seat 121 is connected to the first signal needle 211, the second needle seat 122 is connected to the second signal needle 212, and the power supply terminal 50 passes from the first signal needle 211 through the diode 25 to the second signal needle 212. At this time, the second needle seat 122 is at a high level. It may be identified that the battery pack 10 is mounted with the waterproof plug 20 and is the lowest battery pack 10.

Further, when the energy storage device 100 is in use, the short circuit detection and the water immersion detection are repeated according to a predetermined period. In the embodiment, the predetermined period is 1 second.

Both the first switch elements 81 and the second switch elements 82 are two linked switches, and each of the two linked switches is responsible for a line. Further, the first switch elements 81 include a first switch and a second switch. The first switch and the second switch are interlinked with each other, i.e., the second switch is synchronously off when the first switch is off, and the second switch is synchronously on when the first switch is on. Similarly, the second switch elements 82 include a third switch and a fourth switch. The third switch and the fourth switch are interlinked with each other, i.e., the fourth switch is synchronously off when the third switch is off, and the fourth switch is synchronously on when the third switch is on. Each of the first switch and the fourth switch is electrically connected to the first needle seat 121, and each of the second switch and the third switch is electrically connected to the second needle seat 122. Another terminal of each of the first switch and the second switch is electrically connected to the water immersion detection unit 30. Another terminal of the third switch is connected to the ground terminal 60 through the first resistor 70, and another terminal of the fourth switch is electrically connected to the power supply terminal 50.

In other embodiments, four non-linked switches may also be provided.

In some embodiments, each of the water immersion detection unit 30, the short circuit detection unit 40, and the control assembly is disposed at the battery pack 10.

In this way, the waterproof plug 20 is a consumable part that is easily damaged and lost, which can reduce a quantity of elements and components on the waterproof plug 20 as much as possible, and reduce production costs of the waterproof plug 20, thereby indirectly reducing maintenance costs of the energy storage device 100.

Specifically, the battery pack 10 is provided with a microcontroller 80, and the microcontroller 80 refers to a chip-level computer formed by appropriately reducing a frequency and specification of a central processing unit and integrating peripheral interfaces such as a memory, counter, USB, A/D conversion, UART, PLC, and DMA, and even an LCD drive circuit on a single chip, and performs different combination control for different application scenarios. In this embodiment, the water immersion detection unit 30, the short circuit detection unit 40, the control assembly, and the like are each integrated on the microcontroller 80.

Figure 4:
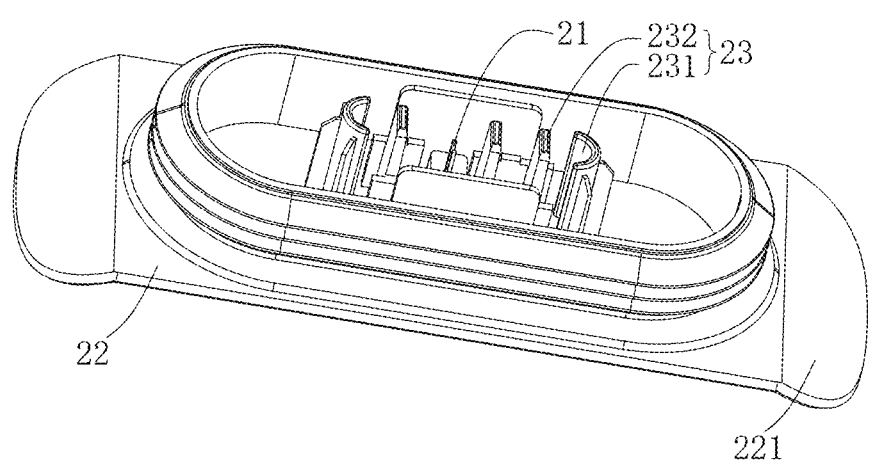
FIG. 4 is a schematic perspective view of a waterproof plug of an energy storage device according to an implementation of the present disclosure.

Referring to FIG. 3 and FIG. 4, in some embodiments, the waterproof plug 20 includes a sealing bottom plate 22. The electrical connection member 21 is disposed at the sealing bottom plate 22 and extends into the opening 111 to cooperate with the connection terminal 12, and the sealing bottom plate 22 covers the opening 111 outside the housing 11.

In this way, the waterproof plug 20 has a simple structure which is easy to manufacture and beneficial for reducing the production costs.

Specifically, in the embodiment of the present disclosure, the sealing bottom plate 22 is a plate member with a thin thickness. It is easy to understand that a size of the sealing bottom plate 22 should be greater than a size of the opening 111. Further, when the waterproof plug 20 is mounted on the housing 11, a sealing pattern may be provided in a region where a surface of the sealing bottom plate 22 close to the housing 11 is attached to the housing 11.

Further, each of all corners of the sealing bottom plate 22 is provided with a transition chamfer, which can also avoid hand injuries and improve safe degrees of manufacturers and assemblers while facilitating processing.

Further, the sealing bottom plate 22 is in a runway shape, and two ends of the sealing bottom plate 22 in a length direction of the sealing bottom plate 22 protrude away from the housing 11 to form a warping edge 221. In this way, each of the two ends of the sealing bottom plate 22 is provided with a warping edge 221, to facilitate disassembly and assembly of the waterproof plug 20.

Specifically, the warping edge 221 is in a semicircular shape, and a side where a diameter of the semicircular warping edge is located is connected to the sealing bottom plate 22. An angle formed by the warping edge 221 and the housing 11 should not be too small, and the angle is too small to provide sufficient convenience when the waterproof plug 20 is mounted or removed. The angle formed between the warping edge 221 and the housing 11 should not be too large. The too large angle allows the warping edge 221 to extend out for a long distance, making the warping edge 221 easily collided. When a collision occurs at the warping edge 221, it is easy to cause the waterproof plug 20 to fall off, causing waterproofing of the battery pack 10 to be destroyed, resulting in safety hazards. Meanwhile, an excessively large angle easily fractures the warping edge 221 when the warping edge 221 is impacted, causing damage to the waterproof plug 20 and increasing maintenance and care costs of the battery pack 10. In the embodiment of the present disclosure, the angle formed by the warping edge 221 and the housing 11 ranges from 15° to 45°. Preferably, the angle formed by the warping edge 221 and the housing 11 is 30°.

Referring to FIG. 3 and FIG. 5, in some embodiments, the connection terminal 12 includes a first guide portion 13. The waterproof plug 20 includes a second guide portion 23. The waterproof plug 20 is configured to ensure, through a cooperation between the first guide portion 13 and the second guide portion 23, an accurate insertion of the electrical connection member 21 into the connection terminal 12.

In this way, the first guide portion 13 cooperates with the second guide portion 23 for guiding, which facilitates an accurate alignment of the electrical connection member 21 with the connection terminal 12.

Specifically, the first guide portion 13 and the connection terminal 12 is an integrated structure by integrally processing and forming, and the second guide portion 23 and the waterproof plug 20 is also an integrated structure by integrally processing and forming.

In some embodiments, the connection terminal 12 includes a terminal portion 14 in a columnar shape. The first guide portion 13 includes an outer cylindrical surface 141 of the terminal portion 14, and the second guide portion 23 includes a guide sleeve 231 extending upward from the sealing bottom plate 22 and matching with the outer cylindrical surface 141.

In this way, the guide sleeve 231 matches with the outer cylindrical surface 141, which can improve matching accuracy of the electrical connection member 21 and the connection terminal 12 while limiting freedom degrees in two directions.

Specifically, the terminal portion 14 is in a semi-cylindrical shape, the outer cylindrical surface 141 is an outer cylindrical surface, and a surface where the guide sleeve 231 matches with the outer cylindrical surface 141 is an inner cylindrical surface. Further, a quantity of terminal portions 14 is two. The two guide sleeves 231 are disposed at two ends of the first guide portion 13, respectively. A quantity of guide sleeves 231 is two. The two guide sleeves 231 are disposed at two ends of the second guide portion 23, respectively.

Further, the first guide portion 13 further has a guide hole 131 formed at an end surface of the terminal portion 14, and the second guide portion 23 includes a guide post 232 extending upward from the sealing bottom plate 22 and matching with the guide hole 131. A height of the guide post 232 is greater than a height of the guide sleeve 231.

In this way, the matching of the guide post 232 and the guide hole 131 is beneficial to further improve the matching accuracy of the electrical connection member 21 and the connection terminal 12. In addition, the height of the guide post 232 is greater than the height of the guide sleeve 231, which can allow the guide post 232 and the guide hole 131 to match first for guiding, making subsequent matching of the guide structure simpler.

Specifically, a plurality of guide posts 232 are provided. The guide posts 232 and the guide holes 131 are disposed in one-to-one correspondence. In the embodiment of the present disclosure, three guide posts 232 are provided and have a completely same shape and size. The electrical connection member 21 is disposed between two guide posts 232.

Further, a rounded corner is formed at a connection between the outer cylindrical surface 141 and the end surface of the terminal portion 14. In this way, the rounded corner can play a role of guiding and righting, making realization of matching and guidance between the guide sleeve 231 and the outer cylindrical surface 141 easier.

Specifically, the rounded corners form a quarter of an outer spherical surface, and a radius of the outer spherical surface is the same as a radius of the outer cylindrical surface 141.

In some embodiments, the energy storage device 100 includes a plurality of battery packs 10 that are laminated to each other. Each of the plurality of battery packs 10 is connected to a lower battery pack 10 of the plurality of battery packs 10 through the connection terminal 12, and a lowest battery pack 10 of the plurality of battery packs 10 is connected to the waterproof plug 20.

Specifically, the quantity of battery packs 10 may be set as actual needs, and the waterproof plug 20 is disposed at the opening 111 at the bottom of the lowest battery pack 10.

In the description of this specification, descriptions with reference to the terms "certain implementations", "an implementation", "some embodiments", "schematic implementations", "examples", "specific examples", or "some examples" etc., mean that specific features, structure, materials or characteristics described in conjunction with the implementation or example are included in at least one implementations or example of the present disclosure. In this specification, the schematic representations of the above terms do not necessarily refer to the same implementation or example. Moreover, the described specific features, structures, materials or characteristics may be combined in any one or more implementations or examples in a suitable manner.

In addition, the terms "first" and "second" are only used for descriptive purposes, and cannot be understood as indicating or implying relative importance or implicitly indicating the number of indicated technical features. Therefore, the features associated with "first" and "second" may explicitly or implicitly include at least one of the features. In the description of the present disclosure, "plurality" means at least two, such as two, three, etc., unless otherwise specifically defined.

Although the embodiments of the present disclosure have been shown and described above, it should be understood that the above-mentioned embodiments are exemplary and should not be construed as limiting the present disclosure. For those of ordinary skill in the art, changes, alternatives, modifications, and variations can be made to the above-mentioned embodiments without departing from the scope of the present disclosure. The scope of the present disclosure shall be defined by the claims as appended and their equivalents.

What is claimed is:

1. An energy storage device, comprising:
   a battery pack comprising a housing and a connection terminal, the housing having an opening, and the connection terminal being disposed at the opening;
   a waterproof plug comprising an electrical connection member, the electrical connection member being configured to: electrically connect to the connection terminal in response to the waterproof plug covering the opening, and generate a first signal in response to water flowing into the opening; and
   a water immersion detection unit configured to determine, by detecting the first signal, that the water flows into the opening, wherein:
   the connection terminal comprises a first needle seat and a second needle seat;
   the water immersion detection unit is connected to the first needle seat and the second needle seat;
   the electrical connection member comprises a first signal needle, a second signal needle, and a water immersion detection wire;
   the first signal needle is connected to the second signal needle through the water immersion detection wire;
   the water immersion detection wire is configured to generate the first signal in response to detecting water immersion;
   in response to the waterproof plug covering the opening, the first signal needle is electrically connected to the first needle seat, and the second signal needle is electrically connected to the second needle seat; and
   the water immersion detection unit is configured to detect, by means of the first needle seat and the second needle seat, an electrical parameter of the water immersion detection wire to detect the first signal.

2. The energy storage device according to claim 1, wherein the electrical parameter comprises one or any combination of a voltage, a current, and a resistance value of the water immersion detection wire.

3. The energy storage device according to claim 2, wherein
   the electrical connection member is configured to, when the resistance of the water immersion detection wire is smaller than its predetermined value in response to the water flowing into the opening, generate the first signal.

4. The energy storage device according to claim 1, wherein the water immersion detection wire comprises a first detection wire and a second detection wire that are spaced apart from each other, the first detection wire being connected to the first signal needle, and the second detection wire being connected to the second signal needle.

5. The energy storage device according to claim 4, wherein the first detection wire and the second detection wire are disposed on a surface of the waterproof plug away from the battery pack.

6. The energy storage device according to claim 1, wherein:
   the electrical connection member is configured to connect to the connection terminal to generate a second signal in response to the waterproof plug covering the opening; and
   the energy storage device further comprises a short circuit detection unit configured to determine, by detecting the second signal, that the battery pack is located at a bottom of the energy storage device.

7. The energy storage device according to claim 6, wherein:
   the first needle seat is connected to a power supply terminal;
   the second needle seat is connected to a ground terminal through a first resistor;
   the first signal needle is connected to the second signal needle through a diode;
   the energy storage device further comprises a control assembly comprising first switch elements, second switch elements, and a controller;
   the first switch elements are disposed between the water immersion detection unit and the first needle seat and between the water immersion detection unit and the second needle seat, respectively;
   the second switch elements are between the power supply terminal and the first needle seat and between the ground terminal and the second needle seat, respectively;
   the controller is configured to control the first switch elements and the second switch elements, to enable the first needle seat and the second needle seat to switch between a first state where each of the first needle seat and the second needle seat is connected to the water immersion detection unit and a second state where the first needle seat is connected to the power supply terminal and the second needle seat is connected to the ground terminal; and
   when the first needle seat and the second needle seat are in the second state, the short circuit detection unit is configured to detect the second signal to determine that the battery pack is located at the bottom of the energy storage device; and
   when the first needle seat and the second needle seat are in the first state, the water immersion detection unit is controlled to detect the first signal when the opening is covered the waterproof plug, to determine that the water flows into the opening.

8. The energy storage device according to claim 7, wherein:
the first switch elements are two linked switches, and the second switch elements are two linked switches;
the first switch elements comprises a first switch and a second switch, the first switch and the second switch being interlinked with each other; and
the second switch elements comprises a third switch and a fourth switch, the third switch and the fourth switch being interlinked with each other.

9. The energy storage device according to claim 8, wherein:
each of the first switch and the fourth switch is electrically connected to the first needle seat, and each of the second switch and the third switch is electrically connected to the second needle seat; and
another terminal of each of the first switch and the second switch is electrically connected to the water immersion detection unit, another terminal of the third switch is connected to the ground terminal through the first resistor, and another terminal of the fourth switch is electrically connected to the power supply terminal.

10. The energy storage device according to claim 7, wherein each of the water immersion detection unit, the short circuit detection unit, and the control assembly is disposed at the battery pack.

11. The energy storage device according to claim 1, wherein the waterproof plug comprises a sealing bottom plate, the electrical connection member being disposed at the sealing bottom plate and extending into the opening to cooperate with the connection terminal, and the sealing bottom plate covering the opening outside the housing.

12. The energy storage device according to claim 11, wherein the sealing bottom plate is in a runway shape, and two ends of the sealing bottom plate in a length direction of the sealing bottom plate protruding away from the housing to form a warping edge,
wherein the warping edge is in a semicircular shape, a side where a diameter of the semicircular warping edge is located being connected to the sealing bottom plate, and the angle formed by the warping edge and the housing ranging from 15° to 45°.

13. The energy storage device according to claim 11, wherein:
the connection terminal comprises a first guide portion; and
the waterproof plug comprises a second guide portion,
wherein the waterproof plug is configured to ensure, through a cooperation between the first guide portion and the second guide portion, an accurate insertion of the electrical connection member into the connection terminal.

14. The energy storage device according to claim 13, wherein the first guide portion and the connection terminal is an integrated structure, and the second guide portion and the waterproof plug is an integrated structure.

15. The energy storage device according to claim 13, wherein the connection terminal comprises a terminal portion in a columnar shape, the first guide portion comprising an outer cylindrical surface of the terminal portion, and the second guide portion comprising a guide sleeve extending upward from the sealing bottom plate and matching with the outer cylindrical surface.

16. The energy storage device according to claim 15, wherein:
the first guide portion further has a guide hole formed at an end surface of the terminal portion;
the second guide portion comprises a guide post extending upward from the sealing bottom plate and matching with the guide hole; and
a height of the guide post is greater than a height of the guide sleeve.

17. The energy storage device according to claim 16, wherein a rounded corner is formed at a connection between the outer cylindrical surface and the end surface of the terminal portion.

18. The energy storage device according to claim 1, wherein the battery pack is further provided with a connection plug at a top of the battery pack, the connection terminal and the connection plug being located on opposite surfaces of the battery, respectively.

19. The energy storage device according to claim 1, wherein the energy storage device comprises a plurality of battery packs that are laminated to each other, each of the plurality of battery packs being connected to a lower battery pack of the plurality of battery packs through the connection terminal, and a lowest battery pack of the plurality of battery packs being connected to the waterproof plug.

* * * * *